(12) United States Patent
Simmons et al.

(10) Patent No.: US 9,261,932 B2
(45) Date of Patent: Feb. 16, 2016

(54) MINIMIZING SWITCHOVER TIME IN A HOT SWAPPABLE PROGRAM MEMORY

(71) Applicant: Microchip Technology Incorporated, Chandler, AZ (US)

(72) Inventors: Michael Simmons, Chandler, AZ (US); Igor Wojewoda, Tempe, AZ (US); Roshan Samuel, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 327 days.

(21) Appl. No.: 13/844,368

(22) Filed: Mar. 15, 2013

(65) Prior Publication Data

US 2014/0281473 A1 Sep. 18, 2014

(51) Int. Cl.
*G06F 9/00* (2006.01)
*G06F 9/24* (2006.01)
*G06F 15/177* (2006.01)
*G06F 1/24* (2006.01)
*G06F 9/44* (2006.01)
*G06F 9/445* (2006.01)

(52) U.S. Cl.
CPC .. *G06F 1/24* (2013.01); *G06F 8/67* (2013.01); *G06F 9/4401* (2013.01); *G06F 9/4406* (2013.01); *G06F 9/4411* (2013.01); *G06F 9/44505* (2013.01)

(58) Field of Classification Search
CPC .. G06F 9/4401; G06F 9/4411; G06F 9/44505
See application file for complete search history.

(56) References Cited

U.S. PATENT DOCUMENTS

| | | | |
|---|---|---|---|
| 6,237,091 B1 * | 5/2001 | Firooz et al. | 713/1 |
| 6,393,560 B1 * | 5/2002 | Merrill et al. | 713/2 |
| 7,213,152 B1 * | 5/2007 | Gafken et | 713/187 |
| 2012/0096252 A1 | 4/2012 | Arditti et al. | 713/2 |

OTHER PUBLICATIONS

Anonymous, "Reboot Linux Faster Using Kexec," URL: http://web.archive.org/web/20120121033946/http://www.imb.com/developerworks/linux/library/1- kexec/index.html, 9 pages, May 4, 2004.
Minnich, Ronald G., "Give Your Bootstrap the Boot: Using the Operating System to Boot the Operating System," Cluster Computing, 10 pages, Sep. 20, 2004.
Elevich, Leonard et al., "AN1094: Bootloader for dsPIC30F/33F and PIC24F/24H Devices," Microchip Technology Incorporated, 14 pages, Dec. 31, 2007.
International Search Report and Written Opinion, Application No. PCT/US2014/019737, 14 pages, May 30, 2014.

* cited by examiner

*Primary Examiner* — Mohammed Rehman
*Assistant Examiner* — Gayathri Sampath
(74) *Attorney, Agent, or Firm* — Slayden Grubert Beard PLLC

(57) ABSTRACT

A method for hot swapping program code includes defining a predetermined range of new code from which to execute; identifying from the new code one or more system components which require a reinitialization or reset; reinitializing or resetting the one or more system components; and executing the new code.

18 Claims, 3 Drawing Sheets

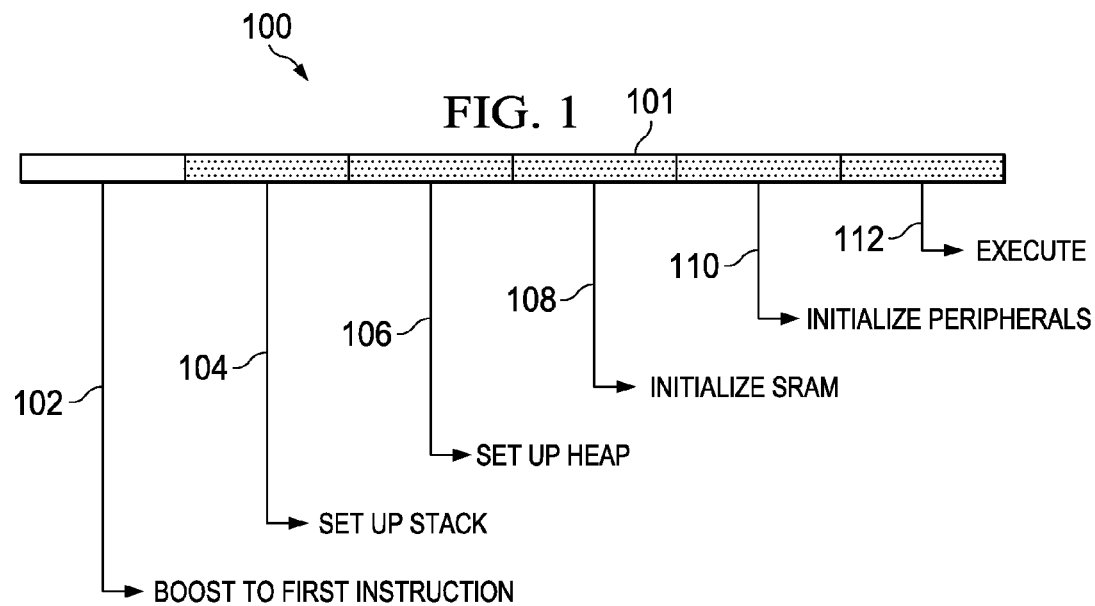
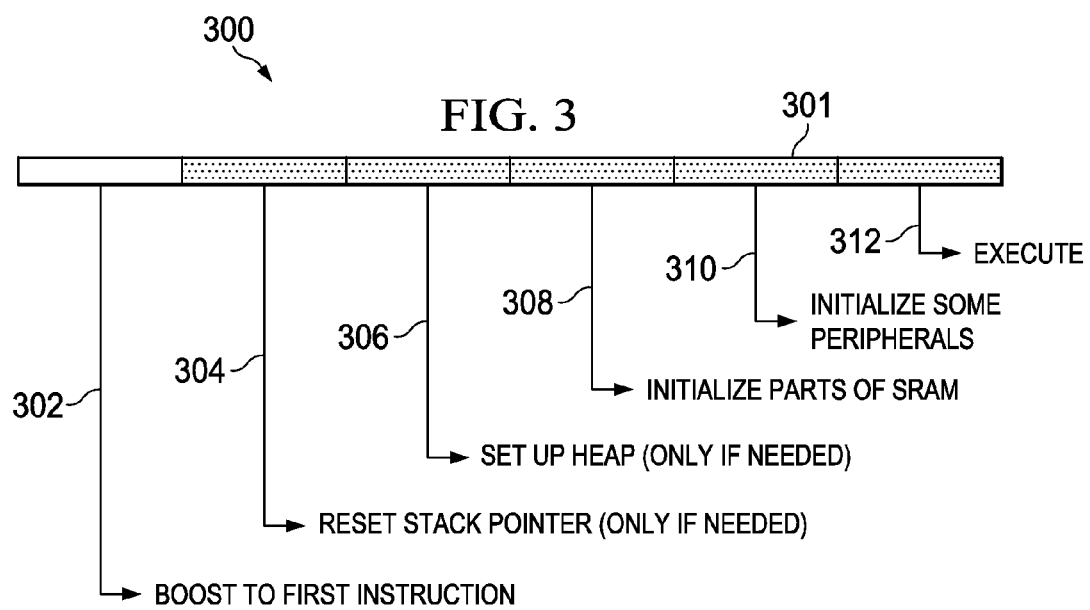

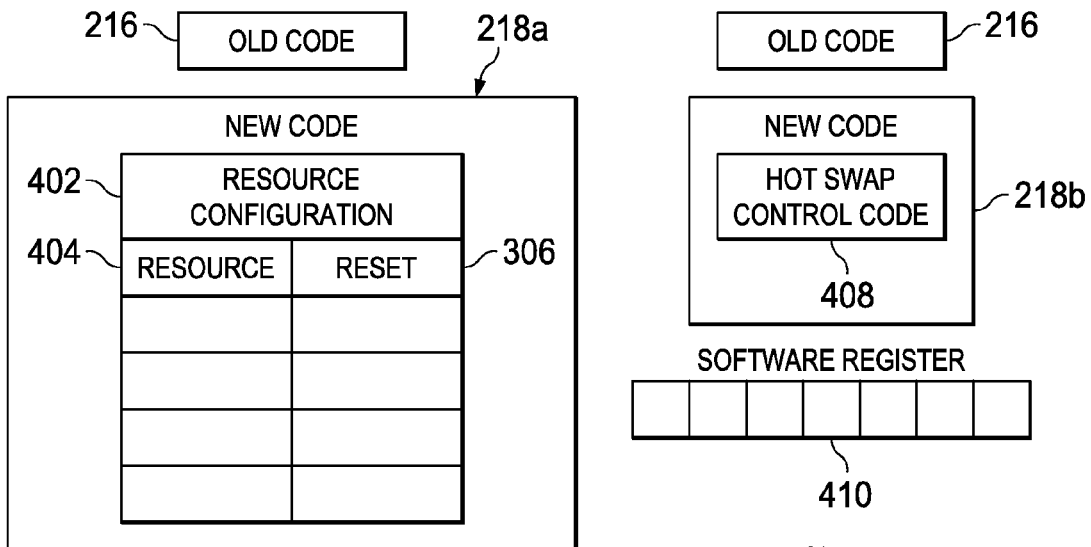
FIG. 4A
FIG. 4B
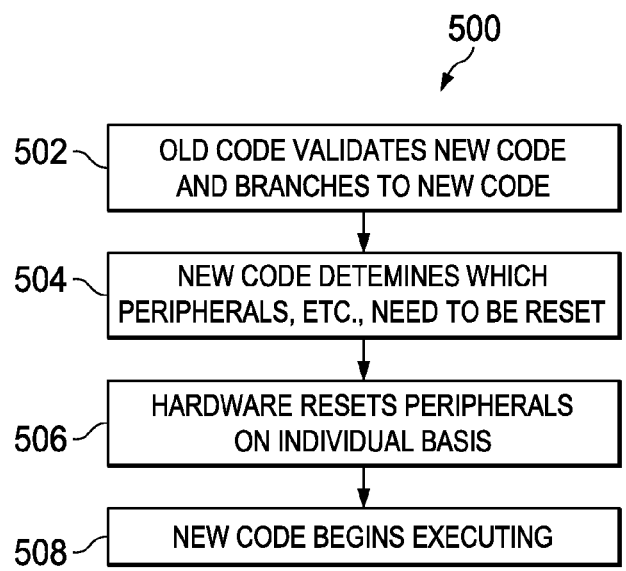
FIG. 5

MINIMIZING SWITCHOVER TIME IN A HOT SWAPPABLE PROGRAM MEMORY

TECHNICAL FIELD

The present disclosure relates to microcontrollers and microprocessors and, particularly, to hot swappable program code.

BACKGROUND

In processors (microprocessors and microcontrollers) with a multi-boot memory architecture, the processor has two or more regions of program memory. These regions may represent a logical partitioning of the memory or may represent actual physical partitions. In general, this architecture is defined by the fact that one region of program memory can be updated while the CPU continues to execute out of another region of program memory.

The typical use case for this is to perform an update of a single set of application code while the application is running. This "hot" update is important for "constant run" applications, where any significant downtime of the processor can be problematic.

Once an application and/or the processor determines that a new version of the code is available in another region, it performs a "hot swap," where transfer of code execution is done from the old region to the new region. This is typically accompanied by a reset of the processor. Such a reset requires a certain amount of time.

More particularly, a typical implementation is to execute from Memory A while updating the program code by writing a complete, new copy of the program image into Memory B. Once the new program image has been written and verified, the MCU/MPU switches over to program execution in the Memory B (the updated program code). Without doing a system reset, this can be a complex operation due to the potential relocation of resources like the stack, heap, program counter, interrupt vector table, etc. However, with a system reset before the switchover, the switchover time is increased, which may not be suitable for constant run applications, such as SMPS (switched mode power supply), motor control, etc.

The total re-boot time is composed of several sequential events, including starting up oscillators/bandgaps/regulators, etc., switching to the correct clock source, setting up the stack, setting up the heap, initializing SRAM, and initializing all peripherals.

For example, shown in FIG. 1 is a schematic illustrating time required for the hot swap. Shown is a timeline 101. Once the new code has booted to a first instruction 102, the stack must be set up 104, the heap must be set up 106, SRAM must be initialized 108, and peripherals must be initialized 110. Only then can the code itself begin to execute 112. As can be appreciated, setting up the stack and the heap, and initializing the SRAM and peripherals can be relatively time-consuming.

Thus, there exists a need for improved switching between memory segments in a hot swappable memory system. There exists a further need to decrease switchover time in such systems.

SUMMARY

These and other drawbacks in the prior art are overcome in large part by a system and method according to embodiments of the present invention. Embodiments provide a solution for minimizing switchover time in a hot swap by determining which peripherals need to be reset and only resetting those peripherals. A method for hot swapping program code according to embodiments includes defining a predetermined range of new code from which to execute; identifying from the new code one or more system components which require a reinitialization or reset; reinitializing or resetting the one or more system components; and executing the new code. In some embodiments, the identifying includes firmware identifying one or more configuration bits defining which of the one or more system components requires a reinitialization or reset. In some embodiments, the identifying is triggered by a switchover from old code to the new code. In some embodiments, the identifying is triggered by a register write from the new code. In some embodiments, the identifying includes a predetermined segment of code in the new code reading one or more software configuration registers defining which of the one or more system components requires a reinitialization or reset.

A processor according to embodiments is configured to implement hot swapping program code by defining a predetermined range of new code from which to execute; identifying from the new code one or more system components which require a reinitialization or reset; reinitializing or resetting the one or more system components; and executing the new code. In some embodiments the identifying includes firmware identifying one or more configuration bits defining which of the one or more system components requires a reinitialization or reset. In some embodiments the identifying is triggered by a switchover from old code to the new code. In some embodiments the identifying is triggered by a register write from the new code. In some embodiments the identifying includes a predetermined segment of code in the new code reading one or more software configuration registers defining which of the one or more system components requires a reinitialization or reset.

A computer program product for hot swapping program code according to embodiments includes one or more tangible computer readable media configured for defining a predetermined range of new code from which to execute; identifying from the new code one or more system components which require a reinitialization or reset; reinitializing or resetting the one or more system components; and executing the new code. In some embodiments the identifying includes firmware identifying one or more configuration bits defining which of the one or more system components requires a reinitialization or reset. In some embodiments the identifying is triggered by a switchover from old code to the new code. In some embodiments the identifying is triggered by a register write from the new code. In some embodiments the identifying includes a predetermined segment of code in the new code reading one or more software configuration registers defining which of the one or more system components requires a reinitialization or reset.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 1 is a diagram illustrating exemplary hot swap time.
FIG. 3 is a diagram illustrating exemplary hot swap time.
FIG. 4A and FIG. 4B are schematically illustrate operation of embodiments.
FIG. 5 is a flowchart illustrating operation of embodiments.

DETAILED DESCRIPTION

Figure 2:
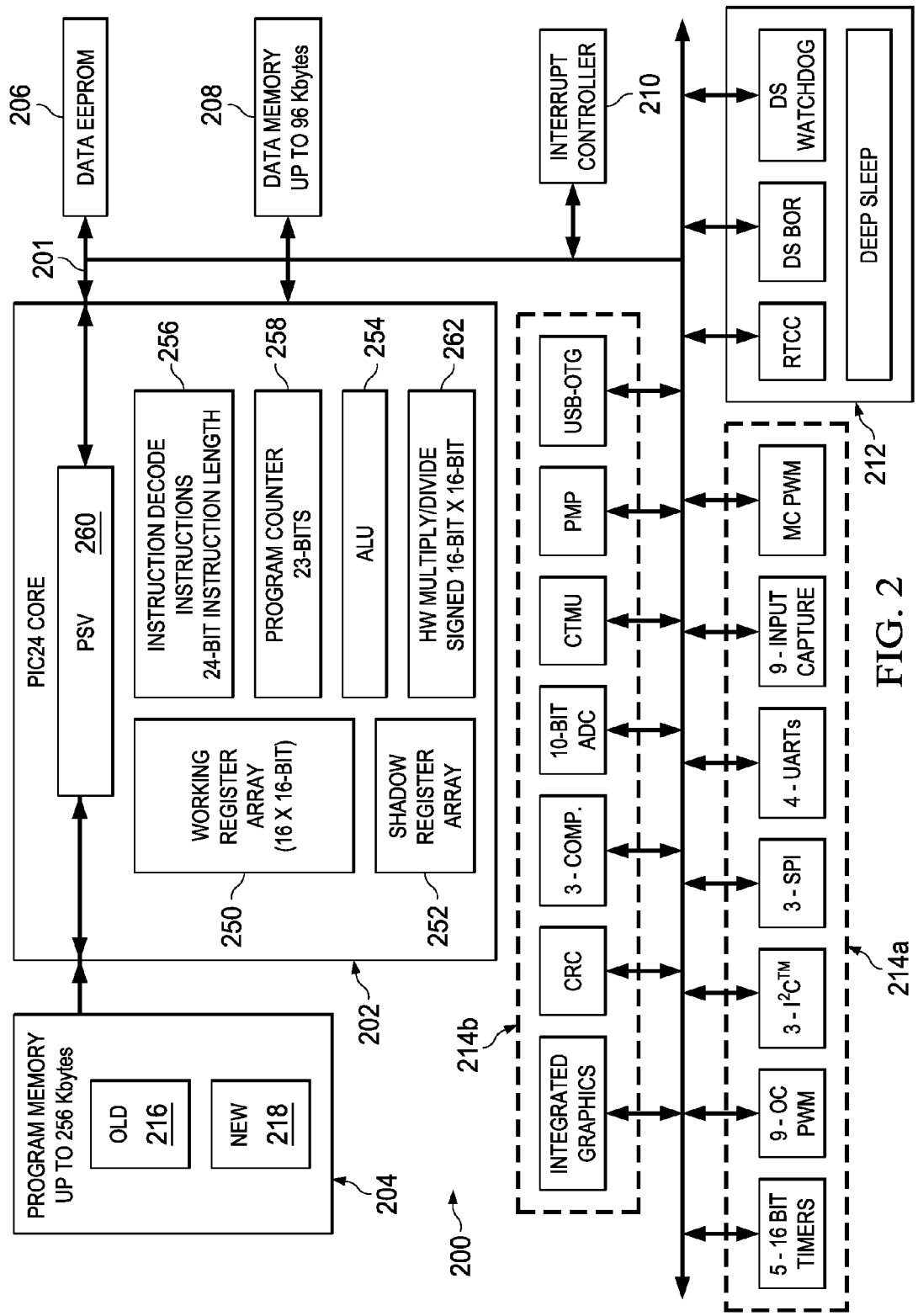
FIG. 2 is a block diagram of an exemplary processor.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Turning now to FIG. 2, a block diagram of an exemplary processor that may implement multi-boot system in accordance with embodiments is shown and generally identified by the reference numeral 200. It is noted that other configurations of a processor or microcontroller are possible. Thus, the figure is exemplary only.

In the example illustrated, processor 200 includes a bus 201 and a central processing unit (CPU) core 202 coupled to the bus 201. The CPU core 202 may include one or more register arrays 250, 252, arithmetic logic unit 254, instruction decode module 256, program counter 258, program space visibility (PSV) module 260, and Hardware Multiply/Divide module 262.

In the embodiment illustrated, also coupled to the bus 201 and in communication with the CPU core 202 are a data EEPROM 206 and data memory 208. Additional devices, such as one or more interrupt controllers 210, one or more peripheral devices 214a, 214b, and clock module 212. The peripherals 214a, 214b may implement, for example, timing, I/O (input/output), PWM (pulse width modulation), etc. Other functions are possible.

In addition, a program memory 204 may couple to or be in communication with the CPU core 202. The program memory may include one or more segments of old code 216 and new code 218. As will be described in greater detail below, embodiments allow for minimizing switchover time by allowing resources to be reset on an individual basis, and by allowing the new (switched-to) code to determine which resources to reset. Thus, if a driver for a particular peripheral has not changed functionality, it need not be reset. Similarly, embodiments allow for specifying if allocated resources such as stack and heap need to be relocated or reset. Other embodiments may additionally reset particular address ranges of RAM, reset the program counter, and reset the PIC working registers.

In operation, the old code 216 validates the new code 218, configures the system to boot from the new code 218, and branches into a suitable entry point in the new code 218 with no system reset. As will be described in greater detail below, in some embodiments, the new code 218 either includes code defining which peripherals need to be reset or for reading values defining which peripherals need to be reset. The defined peripherals are then reset, without requiring a system-wide reset.

This is illustrated schematically with reference to FIG. 3. Shown is timeline 300. Once the new code has booted to a first instruction 302, resetting of peripherals, etc., is accomplished by the new code having determined which peripherals (if any) need to be reset. Thus, the stack may be reset (if needed) 304; the heap may be set up (if needed); those parts of SRAM that need to be initialized may be initialized 308; and those peripherals (if any) that need to be initialized may be initialized 310. The code itself begins to execute 312. As can be appreciated, by resetting or reinitializing only those components which need to be, the reset time is minimized.

More particularly, shown in FIG. 4A is a schematic of a hardware implementation of a hot swap in accordance with embodiments. Shown are old code 216 and new code 218a. New code 218a includes a resource configuration area 402 defining a resource 404 and a configuration bit defining whether it is to be reset 406. The resource configuration area 402 may be a security segment area. In operation, the hardware resets only those resources requiring it, as defined in the configuration area 402 of the new code. Depending on the embodiment, the reset may be triggered by the switchover to the new code or the new code could initiate the reset process via a software action, such as register write, new opcode, etc.

Similarly, shown in FIG. 4B is a software implementation. Shown is old code 216 and new code 218b. New code 218b includes a hot swap control code 408. The new code 408 reads a software register 410 which may include, for example, a single bit per reset resource. In some embodiments, the register 410 is only accessible by particular code in the new code 218b. Such code may be address range based, security scheme segment based, or defined as any code within the first N instructions after swapping. An exemplary security scheme is CodeGuard, although others are contemplated.

Turning now to FIG. 5, a flowchart 500 illustrating operation of an embodiment is shown. The particular arrangement of the elements in the flowchart 500 is not meant to imply a fixed ordering of the elements; other embodiments can be realized by arranging them in any order that is practicable.

In a process step 502, old code 216 may identify or validate a set of new code 218, and branches to the new code 218. In a process step 504, the new code determines which peripherals, etc., need to be reset or reinitialized. As noted above, this may be accomplished in a hardware or a software implementation. In a process step 506, the system hardware resets the peripherals and reinitializes any other components on a component-by-component basis. Finally, the new code may begin executing, in a process step 508.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A method for hot swapping program code in a microcontroller comprising a central processing core comprising a stack and a heap, a program memory comprising a first and second region, a volatile data memory, a plurality of peripheral devices wherein each peripheral device is individually resettable, the method comprising:
executing a current program from the first region of the program memory;
defining a predetermined range of new code in the second region of the program memory from which to execute;
wherein the second region comprises information or instructions whether the stack pointer needs to be set up, whether the heap needs to be set up, whether parts of the volatile data memory need to be initialized, and which peripheral device from the plurality of peripheral devices requires a reinitialization or reset;
wherein a switch-over to the new code performs the steps of:
if required setting up the stack pointer and heap,
if required reinitializing said parts of the volatile data memory; and
reinitializing or resetting one or more peripheral device of the plurality of peripheral device;
and executing the new code.

2. A method in accordance with claim 1, comprising the step of identifying one or more configuration bits defining which of the one or more peripheral devices requires a reinitialization or reset.

3. A method in accordance with claim 2, wherein the identifying is triggered by a switchover from old code to the new code.

4. A method for hot swapping program code in a microcontroller comprising a central processing core comprising a stack and a heap, a program memory comprising a first and second region, a volatile data memory, a plurality of peripheral devices wherein each peripheral device is individually resettable, the method comprising:
executing a current program from the first region of the program memory;
defining a predetermined range of new code in the second region of the program memory from which to execute;
wherein the new code comprises a hot swap control code instruction and wherein the microcontroller comprises information determining whether the stack pointer needs to be set up, whether the heap needs to be set up, whether parts of the volatile data memory need to be initialized, and which peripheral device from the plurality of peripheral devices require a reinitialization or reset;
executing the hot swap control code instruction from the second region of the program memory, wherein the hot swap control code instruction retrieves said information and causes the following steps to be performed depending on said information;
if required setting up the stack pointer and heap,
if required reinitializing said parts of the volatile data memory; and
reinitializing or resetting the one or more peripheral device; and
executing remaining new code.

5. A method in accordance with claim 4, wherein the hot swap control code includes reading one or more software configuration registers defining which of the one or more system components requires a reinitialization or reset.

6. A method in accordance with claim 5, wherein the hot swap control code instruction can only be executed if stored in a predefined address range.

7. A method in accordance with claim 5, wherein the hot swap control code instruction is security scheme segment based.

8. A method in accordance with claim 5, wherein the hot swap control code instruction can only be executed if it is within a first predetermined number of instructions after switchover.

9. A method in accordance with claim 5, wherein said information can only be accessed by the hot swap control code instruction.

10. A microcontroller comprising a central processing core comprising a stack and a heap, a program memory comprising a first and second region, a volatile data memory, a plurality of peripheral devices wherein each peripheral device is individually resettable, wherein the microcontroller is configured to implement hot swapping program code by:
executing a current program from the first region of the program memory;
defining a predetermined range of new code in the second region of the program memory from which to execute;
wherein the second region comprises information or instructions whether the stack pointer needs to be set up, whether the heap needs to be set up, whether parts of the volatile data memory need to be initialized, and which peripheral device from the plurality of peripheral devices requires a reinitialization or reset;
after a switch-over to the new code, depending on said information reinitializing or resetting the stack pointer, heap, volatile data memory and one or more peripheral devices from the plurality of peripheral devices and executing the new code.

11. A microcontroller in accordance with claim 10, wherein the microcontroller is further configured to identify one or more configuration bits defining which of the one or more peripheral devices requires a reinitialization or reset.

12. A microcontroller in accordance with claim 11, wherein identifying is triggered by a switchover from old code to the new code.

13. A microcontroller comprising a central processing core and a plurality of system components including a stack and a heap, a program memory comprising a first and second region, a volatile data memory, and a plurality of peripheral devices wherein each peripheral device is individually resettable, wherein the microcontroller is configured to implement hot swapping program code by:
executing a current program from the first region of the program memory;
defining a predetermined range of new code in the second region from which to execute, wherein the new code comprises a hot swap control code instruction and wherein the microcontroller comprises information determining whether the stack pointer needs to be set up, whether the heap needs to be set up, whether parts of the volatile data memory need to be initialized, and which peripheral device from the plurality of peripheral devices requires a reinitialization or reset;
executing the hot swap control code instruction within the new code, wherein execution of the hot swap control code instruction causes:

identification of one or more of the plurality of system components which require a reinitialization or reset; and reinitializing or resetting the one or more system components;

and thereafter executing remaining new code.

14. A microcontroller in accordance with claim 13, wherein the identification includes reading one or more software configuration registers defining which of the one or more system components requires a reinitialization or reset.

15. A microcontroller in accordance with claim 14, wherein the hot swap control code instruction can only be executed if stored within a predetermined address range.

16. A microcontroller in accordance with claim 14, wherein the hot swap control code instruction is security scheme segment based.

17. A microcontroller in accordance with claim 14, wherein the hot swap control code instruction can only be executed if it is within a first predetermined number of instructions after switchover.

18. A microcontroller in accordance with claim 14, wherein said one or more software configuration registers can only be accessed by the hot swap control code instruction.

* * * * *